(12) United States Patent
Pfrenger et al.

(10) Patent No.: US 9,480,209 B2
(45) Date of Patent: Nov. 1, 2016

(54) IRRIGATION SYSTEM AND METHOD

(75) Inventors: Jochen Pfrenger, Omaha, NE (US);
Reece Andrews, Arlington, NE (US)

(73) Assignee: Lindsay Corporation, Omaha, NE (US)

( * ) Notice: Subject to any disclaimer, the term of this patent is extended or adjusted under 35 U.S.C. 154(b) by 778 days.

(21) Appl. No.: 13/530,418

(22) Filed: Jun. 22, 2012

(65) Prior Publication Data

US 2013/0341419 A1    Dec. 26, 2013

(51) Int. Cl.
*A01G 27/00*   (2006.01)
*A01G 25/09*   (2006.01)

(52) U.S. Cl.
CPC ........... *A01G 25/097* (2013.01); *A01G 25/092* (2013.01)

(58) Field of Classification Search
CPC .................................................. A01G 25/097
USPC ............................................................ 239/67
See application file for complete search history.

(56) References Cited

U.S. PATENT DOCUMENTS

| | | | |
|---|---|---|---|
| 3,690,387 A | 9/1972 | Dixon | |
| 4,226,366 A | 10/1980 | Nortoft | |
| 6,938,842 B2 * | 9/2005 | Choat et al. | 239/729 |
| 2002/0005443 A1 * | 1/2002 | Drechsel | 239/728 |
| 2002/0066810 A1 | 6/2002 | Prandi | |
| 2006/0027677 A1 * | 2/2006 | Abts | 239/67 |
| 2006/0202051 A1 * | 9/2006 | Parsons et al. | 239/69 |
| 2008/0046130 A1 * | 2/2008 | Faivre et al. | 700/284 |
| 2009/0314862 A1 | 12/2009 | Bauman et al. | |
| 2011/0301755 A1 | 12/2011 | Anderson | |
| 2011/0304222 A1 | 12/2011 | Pickerill et al. | |
| 2012/0253530 A1 * | 10/2012 | Malsam | 700/284 |
| 2012/0267447 A1 * | 10/2012 | Abts | 239/69 |
| 2013/0211717 A1 * | 8/2013 | Abts | 701/485 |

FOREIGN PATENT DOCUMENTS

WO    2012021687 A2    2/2012

OTHER PUBLICATIONS

PCT/US2013/023893; Intl. Filing Date Jan. 30, 2013; Notification of Transmittal of the International Search Report and the Written Opinion of the International Searching Authority, or the Declaration; Jun. 17, 2013.

* cited by examiner

*Primary Examiner* — Arthur O Hall
*Assistant Examiner* — Adam J Rogers
(74) *Attorney, Agent, or Firm* — Hovey Williams LLP

(57) ABSTRACT

A method of operating a mobile irrigation system includes receiving water application amount and application pattern information from a user, automatically determining an irrigation plan using the amount information and the pattern information, and using an automated controller to operate the mobile irrigation system according to the irrigation plan. The irrigation system is operated by applying water at progressively decreasing levels as the irrigation system moves from a first position to a second position, and applying water at the same or similar progressively decreasing levels as the irrigation system is moved in a reverse direction from the second position back to the first position.

18 Claims, 13 Drawing Sheets

FIG. 3
- STARTING DEPTH:
- ENDING DEPTH:
- NUMBER OF ZONES:

40

FIG. 4
- TOTAL APPLICATION DEPTH:
- STARTING DEPTH:
- NUMBER OF ZONES:

42

FIG. 5
- START PERCENT RATE:
- END PERCENT RATE:
- NUMBER OF ZONES:

43

| ZONE | START | END | H2O | ACC | RATE | |
|---|---|---|---|---|---|---|
| 1 | 0 | 30 | | ACC | 88.2% | 0.25 |
| 2 | 30 | 60 | | ACC | 71.1% | 0.31 |
| 3 | 60 | 90 | | ACC | 59.5% | 0.37 |
| 4 | 90 | 120 | | ACC | 50.1% | 0.44 |
| 5 | 120 | 150 | | ACC | 44.1% | 0.50 |
| 6 | 150 | 180 | | ACC | 44.1% | 0.50 |
| 7 | 180 | 210 | | ACC | 39.3% | 0.56 |
| 8 | 210 | 240 | | ACC | 35.0% | 0.63 |
| 9 | 240 | 270 | | ACC | 31.9% | 0.69 |
| 10 | 270 | 300 | | ACC | 29.4% | 0.75 |

FIG. 7

IRRIGATION SYSTEM AND METHOD

BACKGROUND

1. Field

Embodiments of the present invention relate to mobile irrigation systems. More particularly, embodiments of the invention relate to mobile irrigation systems and methods of variable water application configured to minimize soil disturbance.

2. Related Art

Mobile irrigation systems include elevated water conduits with a plurality of sprinkler heads depending from the conduits for dispensing water to an irrigated area. The water conduits are supported by towers mounted on wheels that propel the towers along the ground to be irrigated. Pivot type irrigation systems include a series of sections connected at a pivot end to a water source such that the sections follow a generally circular path about the pivot end during operation. Pivot type irrigation systems may be configured to operate in a full circle, wherein the system continuously follows a circular path in either a clockwise or a counter-clockwise direction, or may be configured to operate in a partial circle, wherein the system follows an incomplete circular path and reverses direction at each end of the path.

Lateral type irrigation systems also include a series of sections, but rather than pivoting about a single point follow a generally linear path. Lateral irrigation systems are often configured to reverse direction upon reaching each end of an area to be irrigated.

Irrigation systems that reverse direction during irrigation can present operational challenges. When a mobile irrigation system reverses direction, for example, it travels over ground that was recently irrigated and that may be soft or muddy. This situation may result in the irrigation system creating ruts in the moistened soil or even becoming stuck. The problem is compounded after repeated application as the ruts may become larger and deeper.

One solution to this problem involves pausing operation of the irrigation system at the end of each run long enough to allow the soil to dry before reversing the direction of the system. Because it can take as long as several days to complete an irrigation run in a single direction, and may take many hours for the soil near the irrigation system to dry out sufficiently to avoid disturbance caused by the irrigation system wheels, this solution may result in insufficient water for the field and thus may affect crop production. Another solution involves continuously repairing ruts created by the irrigation system during operation. This solution also suffers from limitations in that it requires a user to repeatedly travel to the field to make the necessary repairs.

SUMMARY

Embodiments of the present invention solve at least some of the above-described problems and provide a distinct advance in irrigation systems. A method of operating a mobile irrigation system in accordance with an embodiment of the invention comprises receiving water application amount information from a user, receiving water application pattern information from the user, automatically determining an irrigation plan using the amount information and the pattern information, and using an automated controller to operate the mobile irrigation system according to the irrigation plan.

The irrigation plan first involves moving the mobile irrigation system from a first position to a second position along a path and, as the irrigation system moves from the first position to the second position, applying water from the irrigation system at a first application level at the first position and gradually decreasing the application level between the first position and the second position such that the water is applied at a second application level at the second position. In one embodiment, the second application level is less than sixty percent of the first application level.

The irrigation plan further involves moving the mobile irrigation system from the second position to the first position along the path and, as the irrigation system moves from the second position to the first position, applying water from the irrigation system at the first application level at the second position and gradually decreasing the application level between the second position and the first position such that the water is applied at the second application level at the first position.

A method of operating a mobile irrigation system in accordance with another embodiment of the invention comprises receiving water application amount information and water application pattern information from a user. The water application amount information includes a starting depth and an ending depth, the starting depth being greater than the ending depth. The water application pattern information includes a number of irrigation zones.

An irrigation plan is automatically created for an irrigation area using the amount information and the pattern information. Creating the plan includes dividing the irrigation area into a number of irrigation zones corresponding to the number of irrigation zones received from the user and determining an application depth for each irrigation zone. A first irrigation zone corresponds to the starting depth, a last irrigation zone corresponds to the ending depth, and a plurality of intermediate irrigation zones each corresponds to an application depth that is less than the starting application depth and greater than the ending application depth. The application depths are progressively less from the first irrigation zone to the last irrigation zone.

An automated controller is used to operate the mobile irrigation system according to the irrigation plan. The mobile irrigation system is moved from a first position to a second position, the first and second positions delineating the irrigation area. As the irrigation system moves from the first position to the second position, water is applied from the system at different application depths corresponding to the application depths assigned to each irrigation zone, wherein the first zone corresponds to the first position, the last zone corresponds to the second position, and each of the intermediate zones corresponds to a portion of the area between the first position and the second position, The mobile irrigation system is then moved from the second position to the first position. As the irrigation system moves from the second position to the first position, water is applied from the system at different application depths corresponding to the application depths assigned to each irrigation zone, wherein the first zone corresponds to the second position, the last zone corresponds to the first position, and each of the intermediate zones corresponds to a portion of the area between the second position and the first position.

An irrigation system in accordance with yet another embodiment of the invention comprises a conduit for carrying and dispensing water, at least one mobile tower for supporting and moving the conduit, and a controller for receiving information from a user and for controlling operation of the irrigation system. The controller is configured to receive water application amount information from the user, receive water application pattern information from the user, automatically determine an irrigation plan using the amount information and the pattern information, and operate the mobile irrigation system according to the irrigation plan.

The irrigation plan involves moving the mobile irrigation system from a first position to a second position along a path and, as the irrigation system moves from the first position to the second position, applying water from the irrigation system at a first application level at the first position and gradually decreasing the application level between the first position and the second position such that the water is applied at a second application level at the second position, the second application level being less than sixty percent of the first application level. The plan further involves moving the mobile irrigation system from the second position to the first position along the path and, as the irrigation system moves from the second position to the first position, applying water from the irrigation system at the first application level at the second position and gradually decreasing the application level between the second position and the first position such that the water is applied at the second application level at the first position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

FIG. 3 is a first exemplary user interface element for receiving water application amount information and water application pattern information from a user, the interface element generated by the system controller;

FIG. 4 is a second exemplary user interface element for receiving water application amount information and water application pattern information from a user, the interface element generated by the system controller;

FIG. 5 is a third exemplary user interface element for receiving water application amount information and water application pattern information from a user, the interface element generated by the system controller;

FIG. 7 is an exemplary user interface element displaying a second portion of an irrigation plan generated by the system controller;

Figure 1:
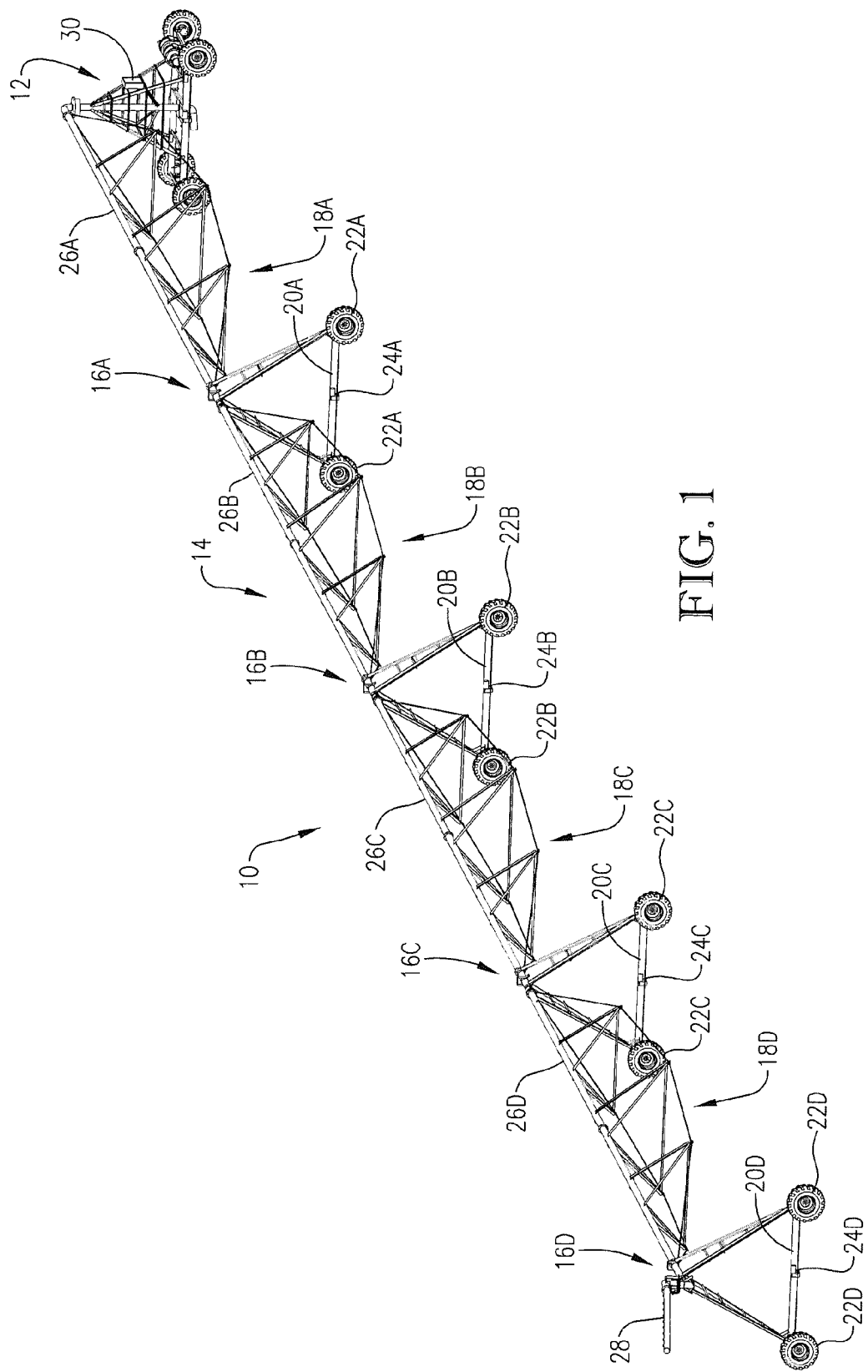
FIG. 1 is a perspective view of an exemplary lateral type mobile irrigation system including a system controller configured in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an exemplary irrigation system 10 is illustrated and includes a controller configured in accordance with embodiments of the invention. The illustrated irrigation system 10 is a lateral movement type irrigation system that broadly comprises a lateral-move cart 12 and a main section 14 connected to the lateral-move cart 12.

The lateral-move cart 12 includes a tower or similar support structure that supports and gives movement to an end of the main section 14. The cart 12 has access to a well, water tank, or other source of water and may also be coupled with a tank or other dispenser to inject fertilizers, pesticides, and/or other additives into the water for application during irrigation.

The main section 14 may comprise a number of mobile support towers 16A-D, the outermost 16D of which is referred to herein as an "end tower". The support towers are connected to the cart 12 and to one another by truss sections 18A-D or other supports to form a number of interconnected spans. The irrigation system 10 illustrated in FIG. 1 includes four mobile support towers 16A-D; however, it may comprise any number of mobile support towers without departing from the scope of the present invention.

Each mobile tower may include a drive tube 20A-D on which a pair of wheel assemblies 22A-D is mounted. Embodiments of the wheel assemblies 22A-D are described in more detail below. A drive motor 24A-D is mounted to each drive tube 20A-D for driving the wheel assemblies 22A-D. The motors 24A-D may include integral or external relays so they may be turned on, off, and reversed. The motors may also have several speeds or be equipped with variable speed drives.

Each of the truss sections 18A-D carries or otherwise supports a conduit section 26A-D or other fluid distribution mechanism that is connected in fluid communication with all other conduit sections. A plurality of sprinkler heads, spray guns, drop nozzles, or other fluid-emitting devices are spaced along the conduit sections 26A-D to apply water and/or other fluids to land underneath the irrigation system 10.

The irrigation system 10 may also include an optional extension arm (not shown) pivotally connected to the end tower 16D and supported by a swing tower with steerable wheels driven by a motor. The extension arm may be joined to the end tower by an articulating pivot joint. The extension arm is folded inward relative to the end tower when it is not irrigating a corner of a field and may be pivoted outwardly away from the end tower while irrigating the corners of a field.

The irrigation system 10 may also include one or more high pressure sprayers or end guns 28 mounted to the end tower 16D or to the end of the extension arm. The end guns 28 may be activated at the corners of a field or other designated areas to increase the amount of land that can be irrigated.

The irrigation system 10 also includes a system controller 30 preferably mounted on the lateral-move cart 12 to provide easy user access. The system controller 30 includes a computing component and other components for use with the computing component, including power components such as batteries, user interface components, and communications components for communicating with the motors 24A-D and/or remote communications equipment, such as a cellular phone network, the Internet or both. The system controller 30 may be encased in a waterproof housing or otherwise sealed from the environment to protect electrical components that may be damaged by water, dust or sunlight.

The computing component of the system controller 30 generally controls operation of the irrigation system 10. The computing component is preferably a digital integrated circuit and may be a general use, commercial off-the-shelf computer processor. Alternatively, the computing component may be a programmable logic device configured for operation with the irrigation system 10, or may be an application specific integrated circuit (ASIC) especially manufactured for use in the irrigation system 10. The computing component may be a single component or may include two or more separate integrated circuits working in cooperation to control operation of the irrigation system 10, and may include one or more analog elements operating in concert with or in addition to the digital circuit or circuits. A memory element for storing data, instructions, or both may be part of or associated with the computing component.

The system 10 is configured to apply water at different rates as it travels through an irrigated area. Such systems commonly adjust the water application rate by regulating operation of the motors rather than regulating a flow rate of the water. More specifically, it is common to adjust the water application rate by adjusting a duty cycle of the motors 24, wherein the duty cycle is a percentage of time the motors 24 are turned on or driving the towers 16. For example, a duty cycle of 25% means the motors 24 are on 25% of the time and off 75% of the time, such that the system 10 moves at 25% of a maximum average speed. This would correspond to a 75% water application rate as moving the system 10 more slowly results in the system 10 applying a greater amount of water. Similarly, a duty cycle of 75% means the motors 24 are on 75% of the time and off 25% of the time, such that the system 10 moves at 75% the maximum average speed, resulting in a 25% water application rate. The particular method used to adjust the water application rate is not important to the present invention and various methods may be used without departing from the spirit or scope of the invention, including adjusting a drive speed of the motors 24 or adjusting a flow rate of the water.

Figure 2:
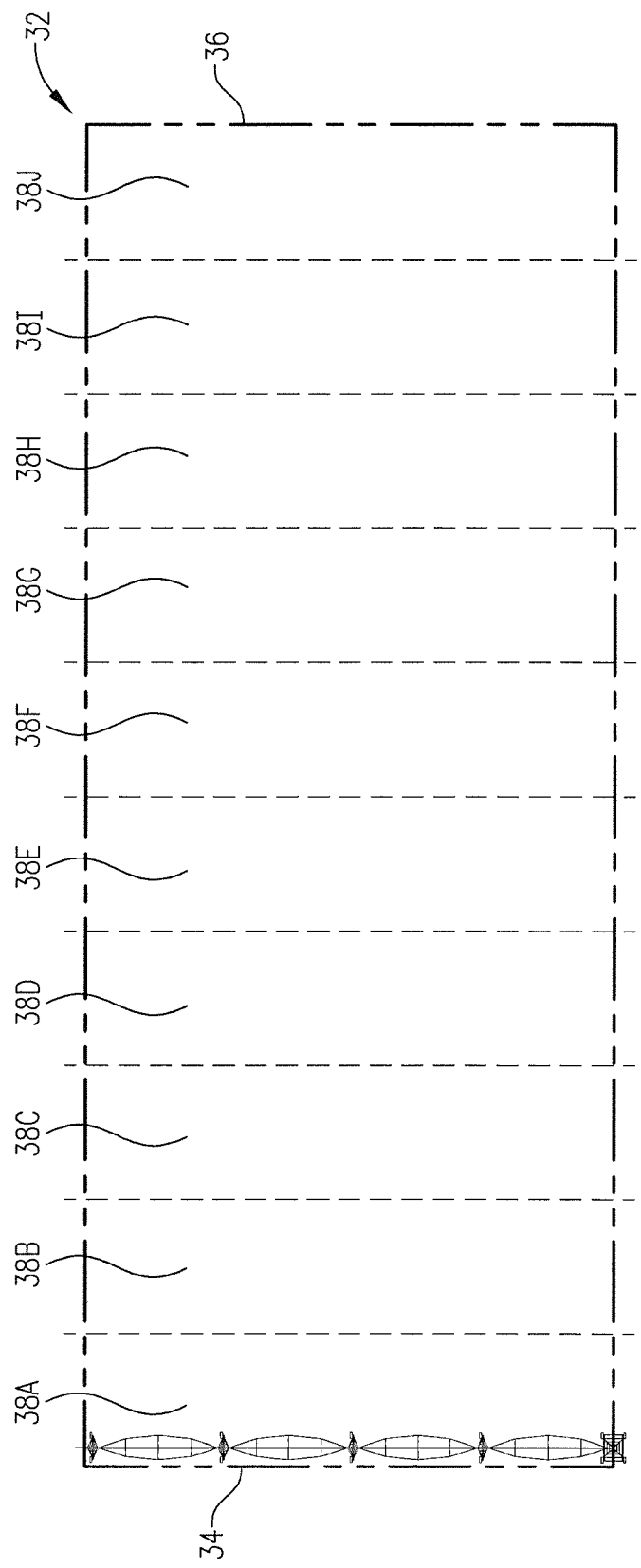
FIG. 2 is a diagram of an area irrigated by the irrigation system of FIG. 1, illustrating the area divided into a plurality of zones, wherein each zone may receive a different amount of water.

The system controller 30 is configured to automatically or substantially automatically generate an irrigation plan based on information received from a user. In particular, the system controller 30 is configured to generate an irrigation plan with a reciprocating pattern that minimizes soil disturbance. As illustrated in FIG. 2, the irrigation plan may relate to a generally rectangular irrigated area 32 that is irrigated by the system 10 such that the system 10 makes a first pass from a first end 34 of the area 32 to a second end 36 along a generally linear path, then makes a second pass as it returns from the second end 36 back to the first end 34 along the same path, and repeats this back-and-forth irrigation process.

Because the system 10 moves relatively slowly along the irrigated area 32 (e.g., as slow as one foot or less per minute) the system 10 must continuously operate to apply water to the irrigated area 32 to avoid portions of the area 32 suffering for lack of water which may occur, for example, if the system 10 were to pause in operations for any substantial amount of time. Conventional irrigation systems apply water at a constant rate as they move from the first end 34 to the second end 36 and back to the first end 34, which presents some problems. As the irrigation system 10 begins its return trip back from the second end 36 to the first end 34, for example, it traverses terrain that was recently watered and, therefore, may be very soft or muddy. In traversing such terrain the wheel assemblies 22 may tend to sink into the soft ground or otherwise displace moistened soil. This may cause ruts in the moistened soil or, worse, the system 10 may lose traction, slowing the travel speed of the system or even causing it to become stuck. As the system 10 repeatedly traverses the same path, the ruts can become large and deeper over time, further compounding the problem.

The system controller 30 is configured to create a plan to avoid the problems created by the irrigation system 10 travelling over soil that has become soft or muddy due to recent irrigation. The irrigation plan involves decreasing the amount of water applied to the area 32 as the system 10 moves from the first end 34 to the second end 36 so that relatively little water is applied by the system 10 as the system 10 approaches the second end 36. Thus, when the system 10 reverses direction it first traverses soil that received relatively little water (or no water at all) on the previous run and, therefore, is sufficiently firm to support the system 10. As the system 10 makes a second run from the second end 36 back to the first end 34, it may apply water to the area 32 according to the same or a similar application pattern it followed in the first run. In other words, the system 10 may apply a decreasing amount of water as it moves from the second end 36 back to the first end 34. Following this pattern, the portion of the area 32 near the second end 36 that receives relatively little water on the first run receives the greatest amount of water on the second run. Similarly, the portion of the area 32 near the first end 34 that receives the greatest amount of water on the first run receives relatively little water on the second run, such that when the irrigation system 10 reverses direction after reaching the first end 34 it will first traverse soil that received relatively little water on the second run and is sufficiently firm to support the system 10.

The system controller 30 is configured to create the irrigation plan using minimal input from the user, thus facilitating use of the system 10. By way of example, the system controller 30 may receive water application amount information and water application pattern information from the user and create the irrigation plan based on that information. FIGS. 3-6 illustrate exemplary user interface elements generated by the system controller 30 for receiving the information from the user and displaying irrigation plan details.

As illustrated in FIG. 2, the controller divides the irrigated area 32 into a number of irrigation zones 38A-J. The system controller 30 assigns water application levels to each zone 38A-J such that the irrigation system 10 applies progressively less water as it moves from the first end 34 to the second end 36, and as it moves from the second end 36 to the first end 34. The user submits information used by the controller in creating the irrigation zones 38 and assigning a water application level to each zone 38A-J. A first exemplary user interface element 40 is illustrated in FIG. 3, including text fields for receiving a starting water application depth, an ending water application depth, and a number of irrigation zones. Another, alternative, exemplary user interface element 42 is illustrated in FIG. 4 and includes text fields for receiving a total water application depth, a starting water application depth, and a number of zones. Yet another, alternative, exemplary user interface element 43 is illustrated in FIG. 5 and includes text fields for receiving a starting percentage rate, an ending water percentage rate, and a number of zones. The starting and ending percentage rates refer to a rate of speed of the irrigation system 10, wherein a higher percentage rate results in a lower water application depth and a lower percentage rate results in a higher water application depth. Using any of these user interfaces 40, 42 or 43, the system controller 30 receives information necessary to divide the irrigated area 32 into zones and to apply a desired amount of water to the area 32.

Figure 6:
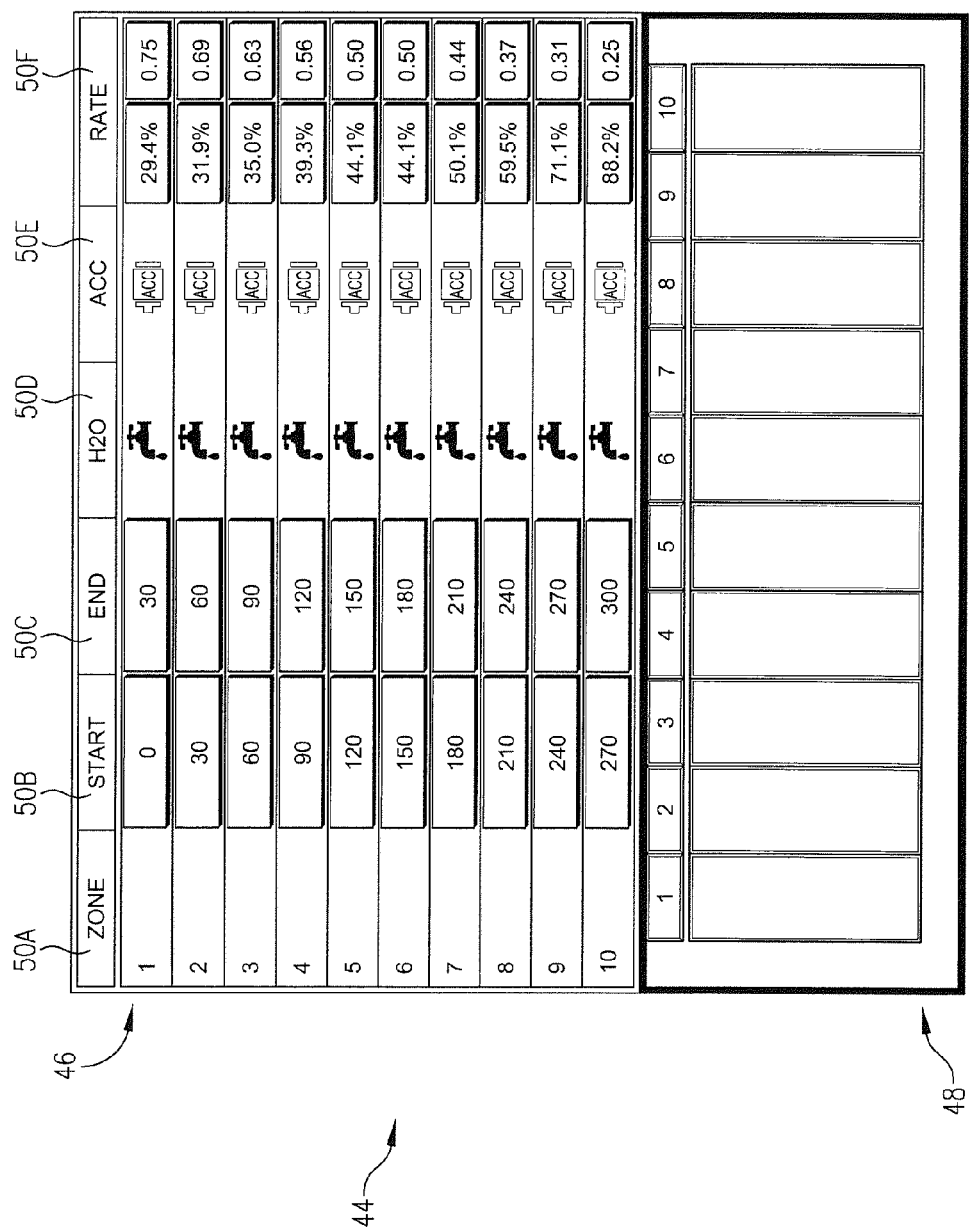
FIG. 6 is an exemplary user interface element displaying a first portion of an irrigation plan generated by the system controller, the user interface element including a rectangular graphical element representing an area irrigated by the irrigation system.

The system controller receives the information submitted by the user from one of the user interface elements 40,42,43 and automatically creates an irrigation plan designed to minimize or eliminate soil disturbance caused by the wheel assemblies 22 as the system 10 travels through the area 32, as explained above. FIG. 6 illustrates another user interface element 44 presenting certain details of the irrigation plan created by the system controller. Each of the irrigation zones 38A-J of the irrigation area 32 corresponds to a row in a top portion 46 of the interface element 44. Each of the irrigation zones 38A-J is also depicted graphically in a lower portion 48 of the interface element 44 for reference by the user, as explained below. A plurality of columns 50A-F provide information about each irrigation zone 38A-J and allow the user to manually manipulate the irrigation plan on a zone-by-zone basis. A first column 50A includes a zone indicator, such as a number; a second column 50B includes a starting position of the zone, such as a number of feet or meters from the first end 34 of the area 32; a third column 50C includes an ending position of the zone, such as a number of feet or meters from the first end 34 of the area 32; a fourth column 50D includes a water application indicator indicating whether water is applied in that zone; a fifth column 50E includes an accessory indicator indicating whether an irrigation accessory is activated for that zone, wherein accessories may include fertilizer or pesticide dispensers; and a sixth column 50F includes one or more water rate application indicators, such as a percentage of total application capacity, a water application depth, or both.

In the illustrated example, the irrigation area 32 is 300 meters long and is divided evenly into ten irrigation zones 38A-J, each zone being 30 meters long. As illustrated in the first row of the user interface element 44, the first zone 38A (corresponding to zone indicator "1" in the first column 50A) represents a portion of the area 32 that is from zero to thirty meters from the first end 34 of the irrigation area 32, and water is applied at a rate of 0.75 inches as the system moves through the first irrigation zone 38A, corresponding to a 29.4% water application rate. Similarly, as illustrated in the second row of the user interface element 44, the second zone 38B (corresponding to zone indicator "2" in the first column 50A) represents a portion of the area 32 from thirty meters to sixty meters from the first end 34 of the area 32. Water is applied at a rate of 0.69 inches as the system 10 moves through the second zone 38B, corresponding to a 31.9% water application rate. As illustrated in FIG. 6, the water application rate generally decreases from one irrigation zone to the next from the first zone 38A to the last 38J in a stepped, linear fashion. Alternatively, the system controller 30 may assign the same water application rate to two or more zones, such as the fifth and sixth zones as illustrated in FIG. 6.

In the exemplary implementation illustrated in FIG. 6, the water application rate in the last irrigation zone 38J is approximately one-third of the water application rate in the first irrigation zone 38A. The difference in water application rates between the first irrigation zone 38A and the last irrigation zone 38J may vary substantially from one embodiment of the invention to another without departing from the scope of the invention. In one embodiment of the invention, the difference is preferably within the range of from about 20% to about 80%, more preferably within the range of from about 30% to about 70%, and may particularly be about 40%, about 50% or about 60%.

The user interface element 44 may be interactive, enabling a user to manipulate the size of the irrigation zones 38 by changing values in the second 50B and third 50C columns; activate or deactivate the application of water and accessories in each irrigation zone 38 by selecting indicators in the fourth 50D and fifth 50E columns; and manipulate the water application rate by changing values in the sixth column 50F. Such changes may be reflected graphically in the lower portion 48 of the user interface element 44 to enable the user to visualize these aspects of the irrigation plan.

The interface element 44 illustrated of FIG. 5 depicts a portion of the irrigation plan corresponding to a first run from a the first end 34 of the area 32 to a second end 36. Another user interface element 52 is illustrated in FIG. 6 that is similar to the interface element 44 except that the element 52 depicts irrigation plan information relating to a second run of the irrigation system 10 from the second end 36 of the irrigation area 32 back to the first end 34 of the irrigation area 32. As can be seen from the interface element 52, the water application rate pattern is reversed in the second run such that water is applied at a greater rate at the second end 36 of the area 32 and gradually decreases as the system 10 moves from the second end 36 to the first end 34 of the area 32. More specifically, the water application rate corresponding to the first irrigation zone 38A in the first run is equal to the water application rate of the last irrigation zone 38J in the second run, the water application rate in the second irrigation zone 38B in the first run is equal to the water application rate of the second to last zone 38I in the second run, and so forth. It will be noted that in the illustrated example, each irrigation zone 38 receives a total of one inch of water after the first and second runs. In other words, the amount of water applied in the first run and the amount of water applied in the second run totals one inch in each irrigation zone.

With reference again to FIGS. 3, 4 and 5, the user interface element 40 of FIG. 3 may be used to collect information from the user to generate the plan illustrated in elements 44 and 52, wherein a user submits a starting depth of 0.75 inches, an ending depth of 0.25 inches, and ten zones. If the user interface element 42 of FIG. 4 is used, a user may submit a total application depth of one inch, a starting depth of 0.75 inches, and ten zones. If the user interface element 43 of FIG. 5 is used, a user may submit a starting percentage rate of 29.4%, an ending percentage rate of 88.2%, and ten zones. It will be appreciated that these three user interface elements 40,42,43 are exemplary in nature and that various methods may be used to collect irrigation information from the user without departing from the spirit or scope of the present invention.

Figure 8:
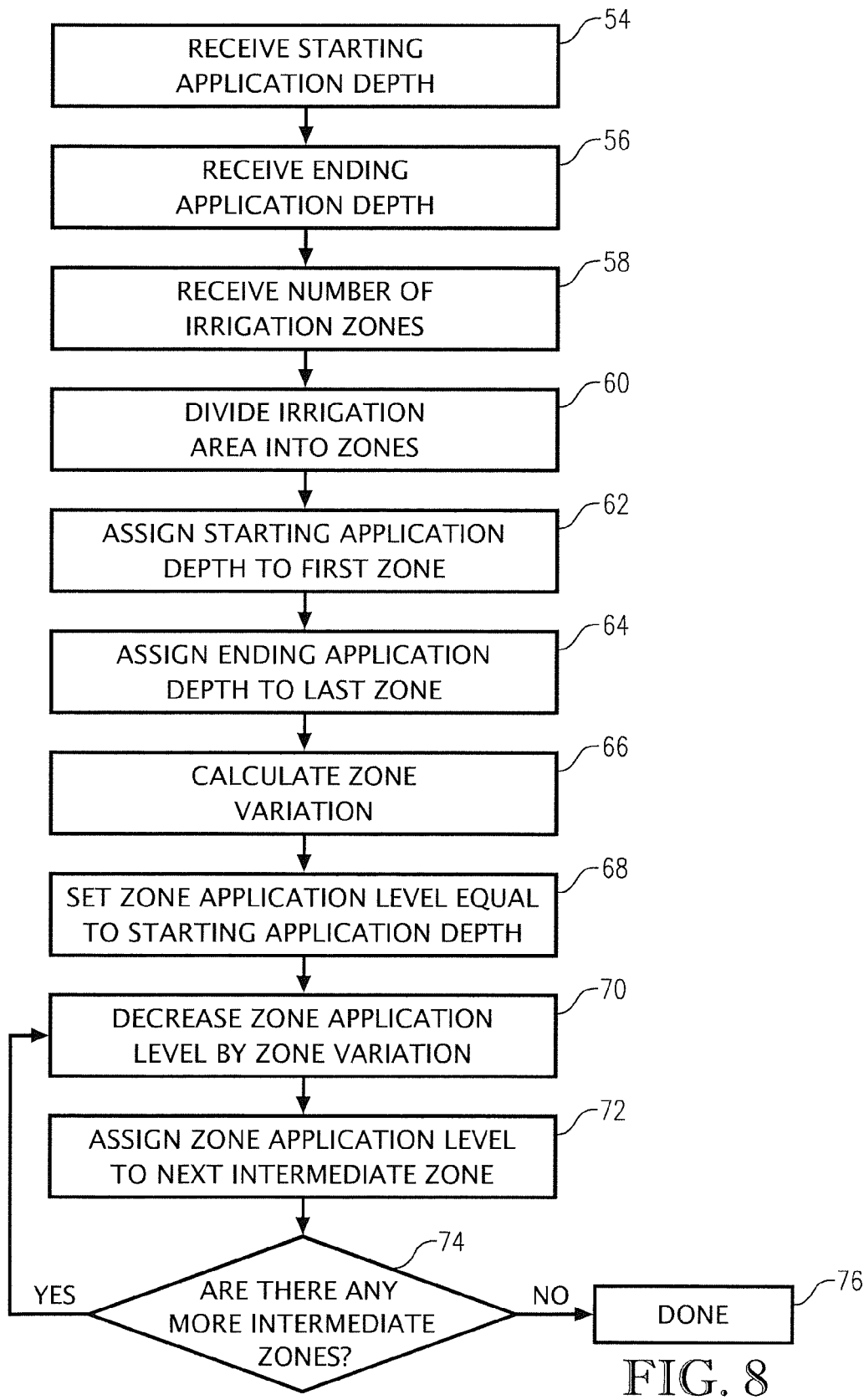
FIG. 8 is a flow diagram depicting certain steps in a method of automatically generating an irrigation plan using the system controller of the mobile irrigation system of FIG. 1.

An exemplary method of automatically creating the irrigation plan using the system controller 30 is illustrated in the flow diagram of FIG. 8. The system controller first receives the starting application depth, as illustrated in block 54, receives the ending application depth, as illustrated in block 56, and receives the number of irrigation zones, as illustrated in block 58. This information may be received, for example, via the user interface element 40 of FIG. 3. The system controller then divides the irrigation area 32 into zones, as depicted in block 60. The system controller may divide the area into zones by dividing a total length of the area 32 by the number of zones submitted by the user. A total length of the area 32 may be submitted or programmed by the user at the time the irrigation system 10 is installed in the field. In the illustrated example, the total length of the irrigation area 32 is 300 meters, and the number of zones is ten, therefore dividing the total length of the area 32 by the number of zones yields thirty meters per zone.

The system controller 30 assigns the starting application depth to the first zone, as depicted in block 62. If the starting application depth received from the user is 0.75 inches, for example, the controller assigns 0.75 inches to zone one. The system controller 30 assigns the ending application depth to the last zone, as depicted in block 64. If the ending application depth received from the user is 0.25 inches, for example, the system controller 30 assigns 0.25 inches to zone ten. The system controller 30 then calculates a zone variation, as depicted in block 66. The zone variation is the amount the water application rate changes from one zone to the next. If the water application pattern is to follow a stepped, linear pattern, for example, the following equation may be used to determine the zone variation:

$$\text{Zone Variation} = \frac{\text{Starting Depth} - \text{Ending Depth}}{\text{Number of Intermediate Zones} + 1}$$

In this equation, the number of intermediate zones is two less than the total number of zones submitted by the user. That is, the number of intermediate zones is the total number of zones other than the first zone and the last zone. By way of example, if the starting application depth is one inch, the ending application depth is one-half inch, and the total number of zones is ten, the zone variation is about 0.055. Following this pattern, the water application rate in zone one is one inch, the water application rate in zone two is about 0.95 inches, the water application rate in zone three is 0.89 inches, and so forth.

To create an irrigation plan according to the pattern depicted in FIGS. 6 and 7, wherein two consecutive zones are assigned the same water application rate, the zone variation equation may be modified as follows:

$$\text{Zone Variation} = \frac{\text{Starting Depth} - \text{Ending Depth}}{\text{Number of Intermediate Zones}}$$

Thus, in the illustrated example, the starting depth is 0.75 inches, the ending depth is 0.25 inches, and there are ten total irrigation zones with a total of eight intermediate zones, and two consecutive zones (zones 5 and 6) are assigned the same water application rate. Applying these numbers to the equation, the zone variation is 0.0625.

Once the zone variation is calculated, the system controller 30 sets a zone water application level equal to the starting water application depth received from the user, as depicted in block 68, and decreases the zone application level by an amount equal to the zone variation, as depicted in block 70. The controller 30 assigns the zone application level to the next intermediate zone, as depicted in block 72. The first time this step is performed, the next intermediate zone is the second zone. If there are additional intermediate zones, the process returns to block 70, as depicted in block 74. If the process returns to block 70, the zone application level is further decreased by the zone variation amount and the new zone variation value is assigned to the next intermediate zone. When all intermediate zones have been assigned an application level, the process terminates, as depicted in block 76.

Figure 10:
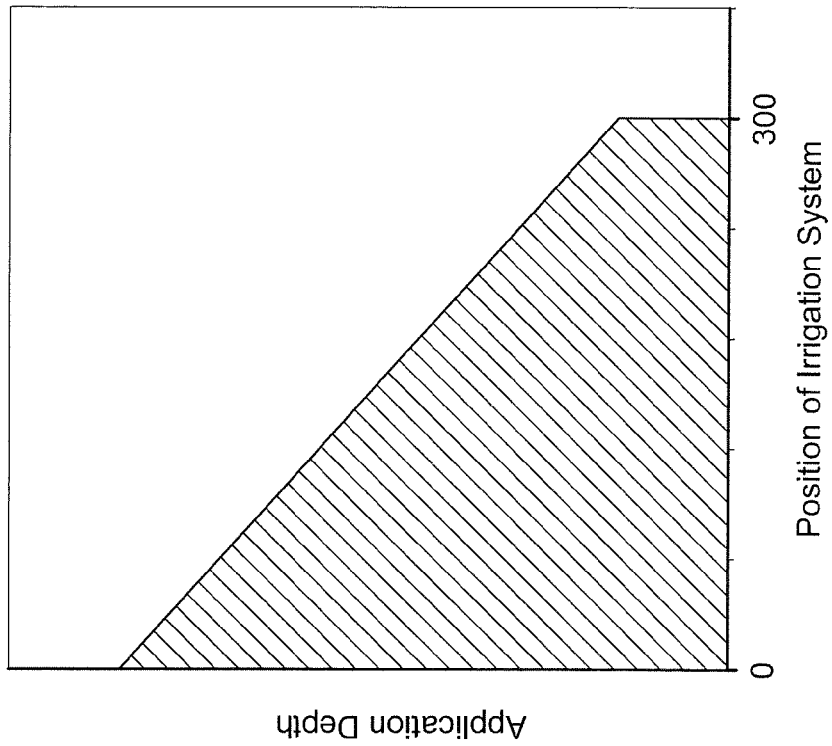
FIG. 10 is a graph of water application depth versus position of the irrigation system, illustrating a linear smooth pattern of decreasing water application depth as the mobile irrigation system progresses through an irrigated area.
Figure 9:
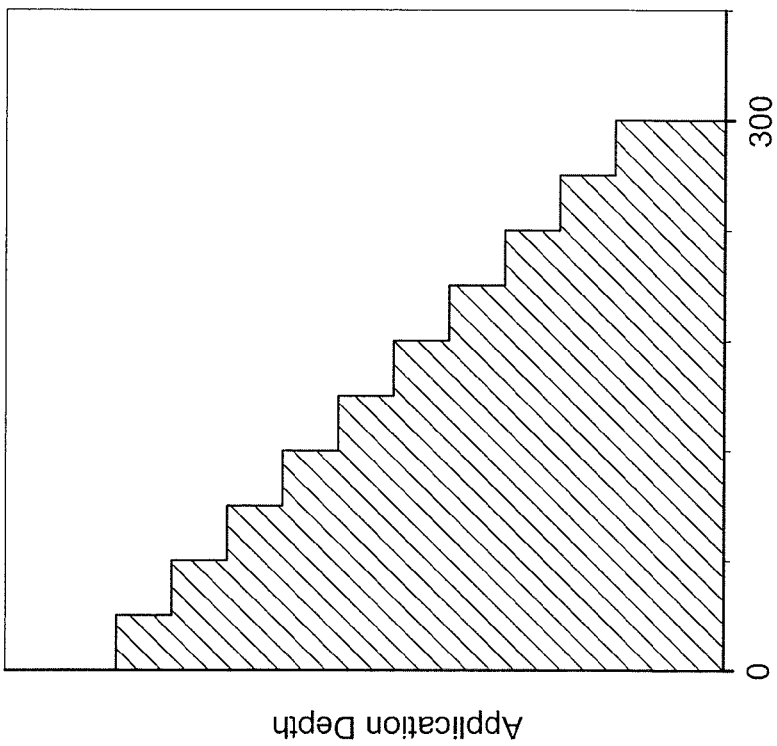
FIG. 9 is a graph of water application depth versus position of the irrigation system, illustrating a linear stepped pattern of decreasing water application depth as the mobile irrigation system progresses through an irrigated area.

The method illustrate in the flow diagram of FIG. 8 results in a stepped irrigation pattern wherein the irrigation system 10 applies water according to a water application depth in each irrigation zone 38, and only adjusts the water application depth at the zone boundaries. This pattern is depicted graphically in FIG. 9. An alternative application pattern is depicted graphically in FIG. 10, wherein the water application also begins at a first, higher rate and decreases to a second, lower rate as the irrigation system 10 progresses from a first end of the area 32 to a second end. However, while the irrigation pattern of FIG. 9 is stepped, the pattern of FIG. 10 is smooth. A smooth pattern may be applied, for example, where the water application rate of the system 10 is gradually and continuously decreased as the system 10 moves across the irrigated area 32. Whether the irrigation system 10 applies water according to a smooth pattern or a stepped pattern, the system 10 gradually decreases the water application level as the system 10 moves from a first end of the irrigation area 32 to a second end of the irrigated area 32.

Figure 12:
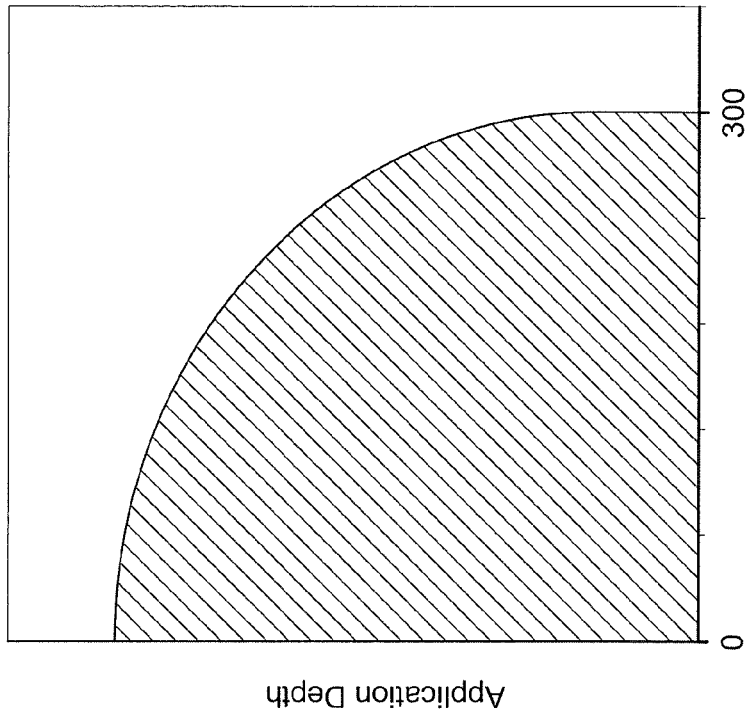
FIG. 12 is a graph of water application depth versus position of the irrigation system, illustrating a nonlinear smooth pattern of decreasing water application depth as the mobile irrigation system progresses through an irrigated area.
Figure 11:
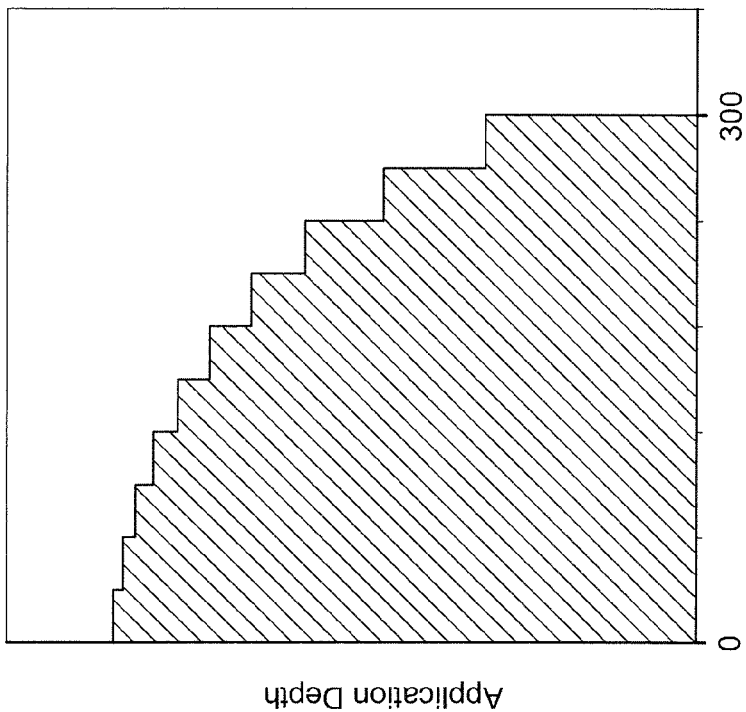
FIG. 11 is a graph of water application depth versus position of the irrigation system, illustrating a nonlinear stepped pattern of decreasing water application depth as the mobile irrigation system progresses through an irrigated area.
Figure 13:
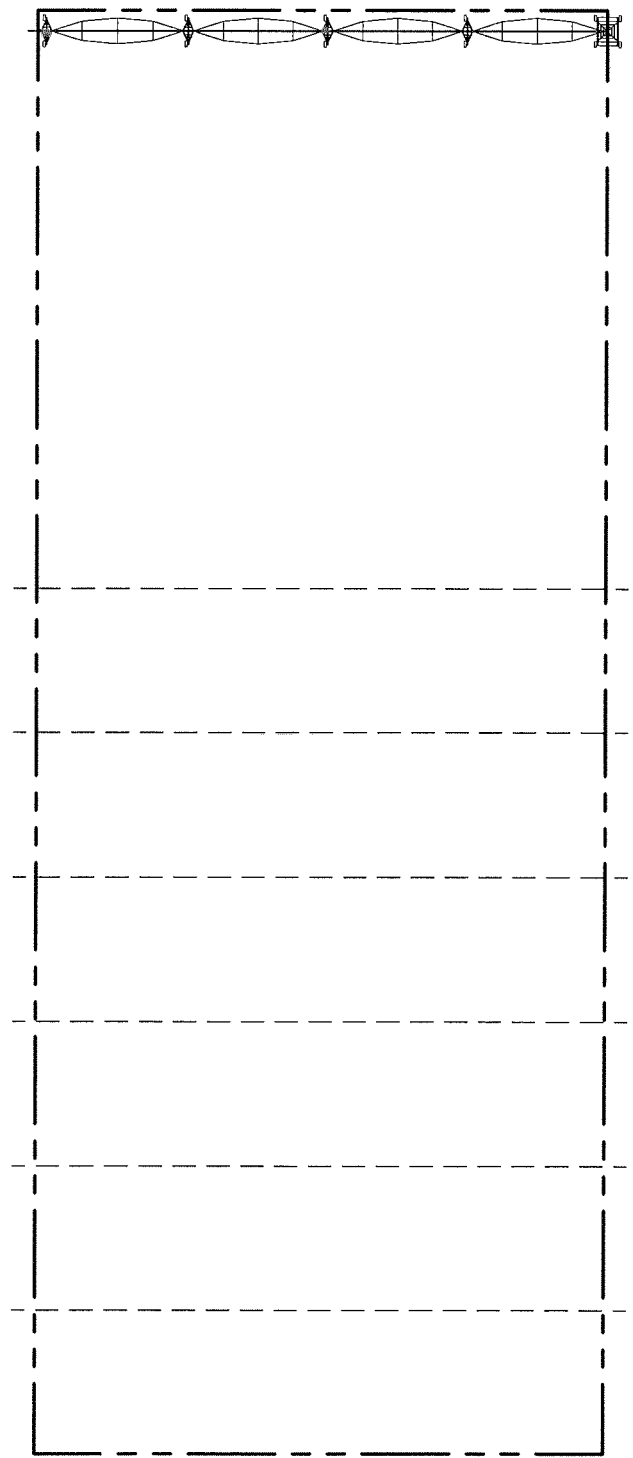
FIG. 13 is a second diagram of the area irrigated by the irrigation system of FIG. 1, illustrating the area divided into a plurality of zones by the system controller, one zone being larger than the other zones.

Both of the patterns illustrated in FIGS. 9 and 10 are linear in nature. The stepped pattern of FIG. 9 is linear in that the variation in water application is uniform across the plurality of zones. The smooth pattern of FIG. 10 is linear in that the change in water application rate is constant from one end of the irrigated area to the other end. The system controller 30 may also be configured to create non-linear irrigation patterns, as depicted in FIGS. 11 and 12. Furthermore, although the irrigation zones 38 illustrated and described above are all of equal size, it may be desirable to create irrigation plans including irrigation zones of different sizes. By way of example, FIG. 13 depicts an irrigation area divided into seven irrigation zones wherein one of the zones is substantially larger than the remaining zones. All of these variations are within the ambit of the present invention.

The user interface elements described above are generated and enabled by the system controller 30. The system controller 30 may present the user interface elements via a display that is part of the controller 30 and located on the cart 12, or may present the user interface elements remotely via a wired or wireless telecommunications channel. Thus, a user may interact with the system controller 30 on-site or from a remote location with the proper telecommunications connections.

Figure 14:
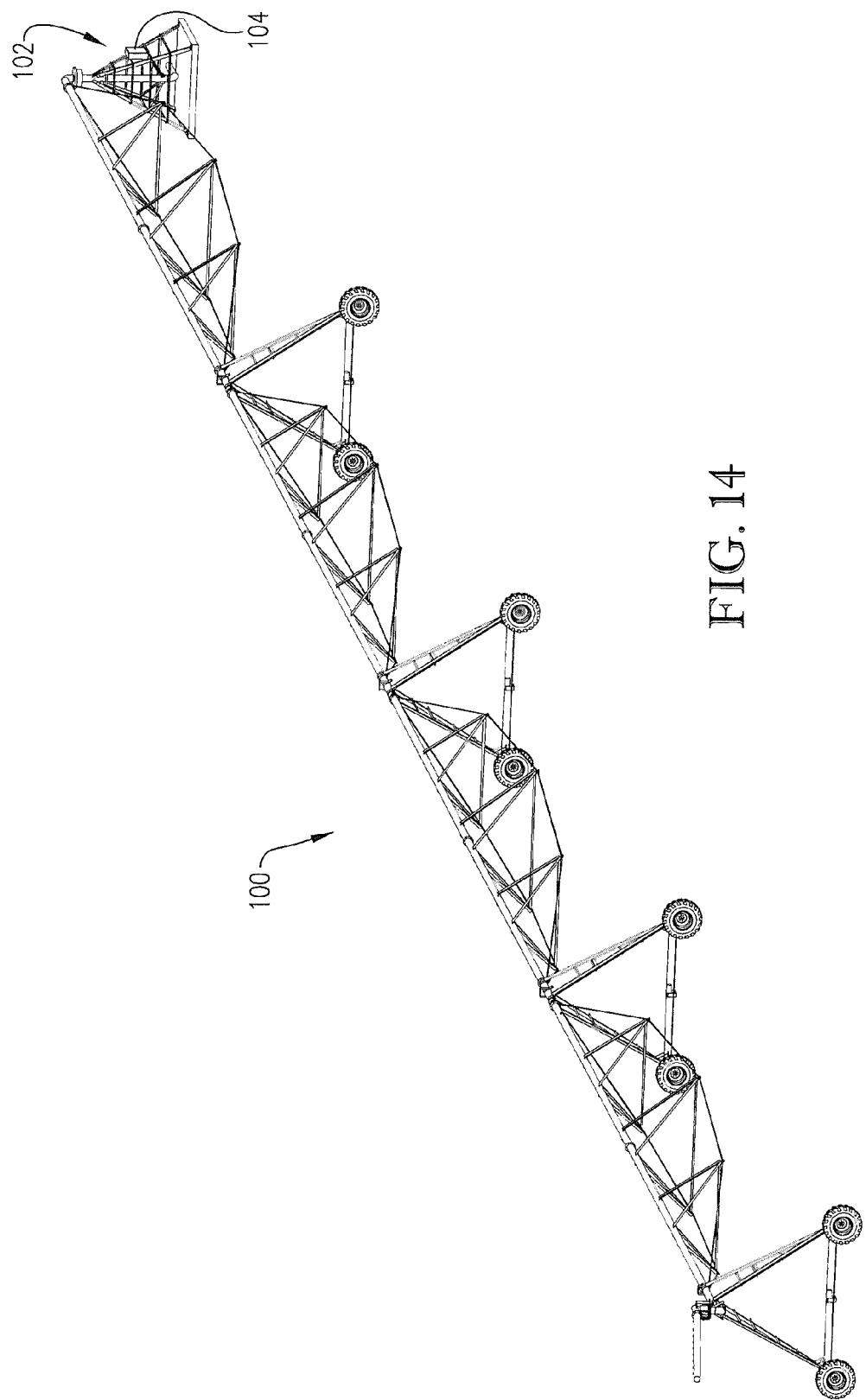
FIG. 14 is a perspective view of an exemplary pivot type mobile irrigation system including a system controller configured in accordance with embodiments of the invention.

Another exemplary irrigation system 100 constructed in accordance with embodiments of the invention is illustrated in FIG. 14. The irrigation system 100 is similar to the irrigation system 10 described above, except the irrigation system 100 is a pivot-type irrigation system. Thus, rather than the cart 12 described above, the system 100 includes a fixed central pivot 102 which may be a tower or similar support structure about which the system 100 pivots. The central pivot 102 has access to a well, water tank, or other source of water and may also be coupled with a tank or other dispenser to inject fertilizers, pesticides, and/or other additives into the water for application during irrigation.

The system 100 includes a system controller 104 that may be identical to the system controller 30 described above except that the system controller 104 is configured for operation with pivot-type irrigation systems, such as the system 100. In creating an irrigation plan for the system 100, the system controller 104 receives water application amount and application pattern information from the user, as explained above in relation to the system 10.

Figure 15:
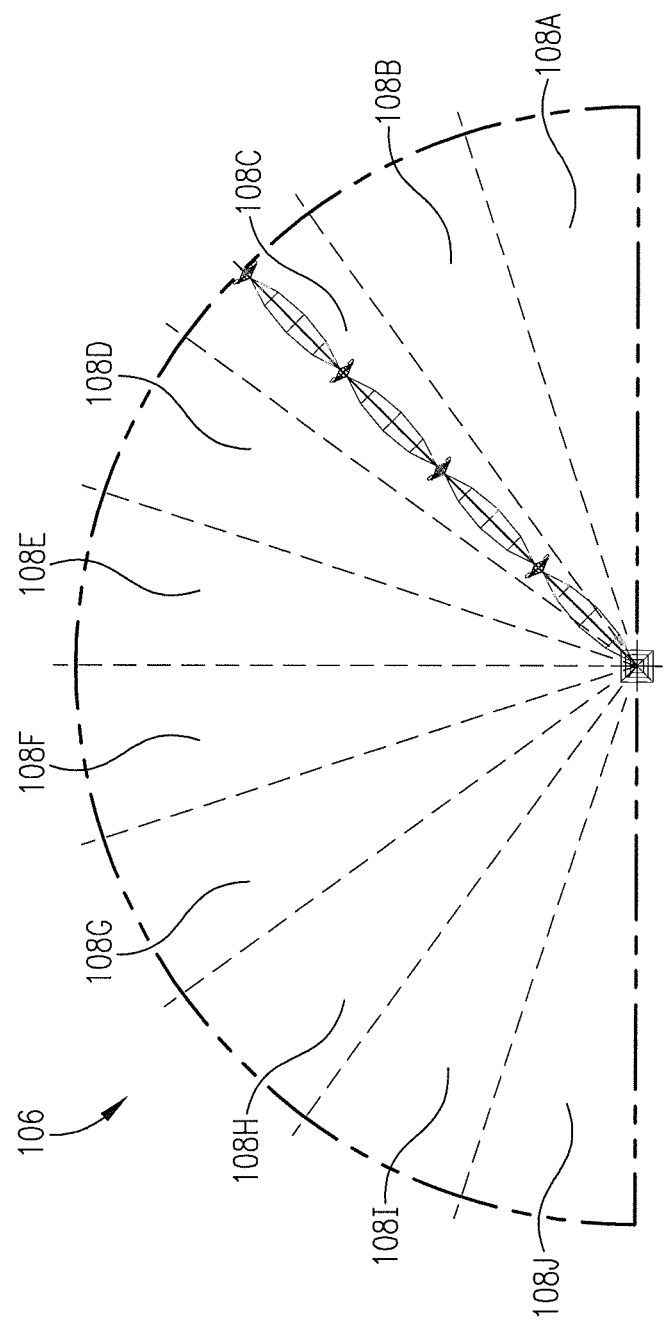
FIG. 15 is a diagram of an area irrigated by the irrigation system of FIG. 11, illustrating the area divided into a plurality of zones by the system controller, wherein each zone may receive a different amount of water.

An irrigation area 106 divided into a plurality of irrigation zones 108 according to an exemplary irrigation plan created by the system controller 104 is illustrated in FIG. 15. The irrigation area 106 forms a semicircle defined by the irrigation system 100 as it pivots back and forth about the central pivot 102 following an arcuate path between a first position and a second position. The area is divided into a plurality of wedge-shaped irrigation zones 108A-J that serve a similar purpose as the irrigation zones 38A-J described above.

Figure 16:
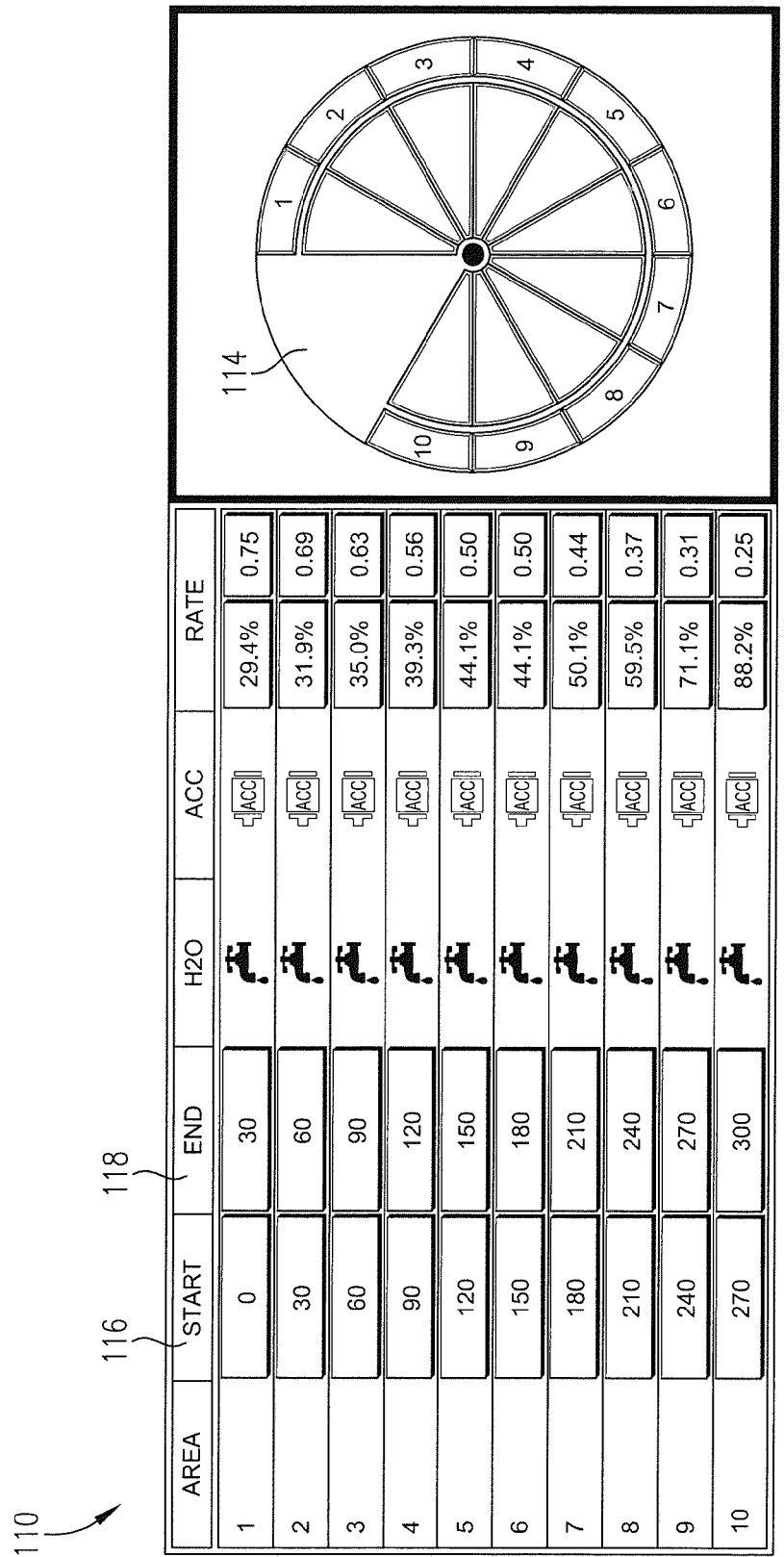
FIG. 16 is an exemplary user interface element displaying a first portion of an irrigation plan generated by the system controller of the irrigation system of FIG. 11, the user interface element including a circular graphical element representing an area irrigated by the irrigation system.
Figure 17:
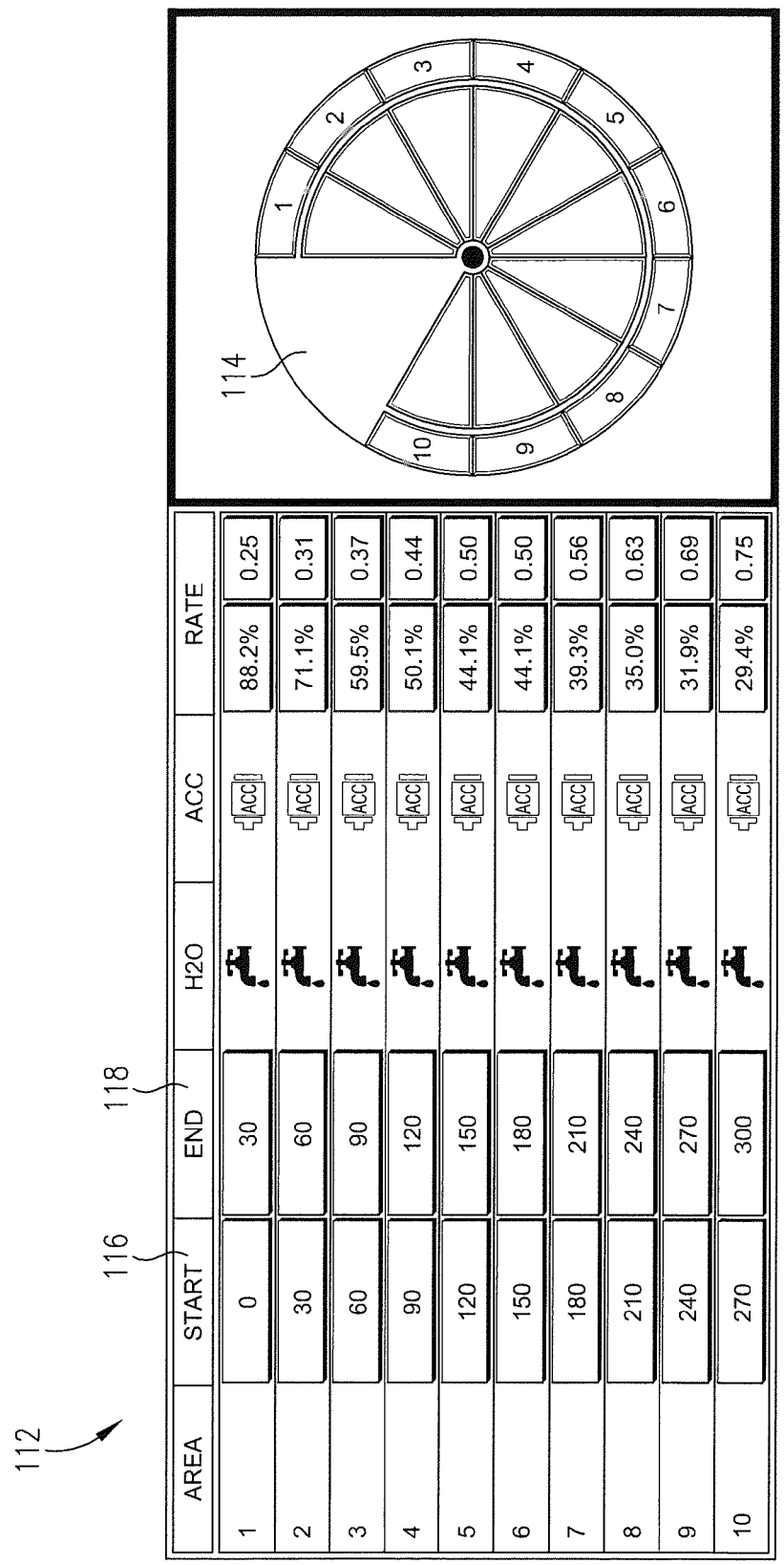
FIG. 17 is an exemplary user interface element displaying a second portion of an irrigation plan generated by the controller of the irrigation system of FIG. 11.

FIGS. 16 and 17 depict exemplary user interface elements 110,112 illustrating an irrigation plan created by the system controller 104 for an area irrigated by the irrigation system 100. The user interface elements 110,112 are substantially similar to the user interface elements 44,52 described above in both form and function, with a few notable differences. Each user interface element 110,112 presents a graphical representation 114 of an irrigated area, wherein the area is circular in nature. Furthermore, the second 116 and third 118 columns of each interface 110,112 may define each irrigation zone by the starting and ending degrees of rotation. Alternatively, each irrigation zone may be defined by an arc length associated with an outer circumference of each section.

As can be seen from the drawings, the system 100 may be configured to cover areas of various sizes and shapes, including a semicircular area as illustrated in FIG. 15 or a larger area that nearly forms a full circle, as illustrated in the graphical representations 114 of the user interface elements 110,112.

Although the invention has been described with reference to the exemplary embodiments illustrated in the attached drawings, it is noted that equivalents may be employed and substitutions made herein without departing from the scope of the invention as recited in the claims. For example, while the irrigation system 10 has been described and illustrated with a system controller 30 mounted on the cart 12, some or all of the functionality associated with the system controller 30, including the computing component and the user interface, may be implemented in a remote system that is in wired or wireless communications with the irrigation system 10.

Having thus described various embodiments of the invention, what is claimed as new and desired to be protected by Letters Patent includes the following:

1. A method of operating a mobile irrigation system, the method comprising:
receiving water application amount information from a user;
receiving water application pattern information from the user;
automatically determining an irrigation plan using the amount information and the pattern information; and
using an automated controller to operate the mobile irrigation system according to the irrigation plan, including—
moving the mobile irrigation system from a first position to a second position along a path,
as the irrigation system moves from the first position to the second position, applying water from the irrigation system at a first application level at the first position and gradually decreasing the application level between the first position and the second position such that the water is applied at a second application level at the second position, the second application level being less than sixty-percent of the first application level,
moving the mobile irrigation system from the second position to the first position along the path, and
as the irrigation system moves from the second position to the first position, applying water from the irrigation system at the first application level at the second position and gradually decreasing the application level between the second position and the first position such that the water is applied at the second application level at the first position so as to reduce irrigation effects on the path near the first and second positions before the irrigation system reverses directions at the first and second positions.

2. The method of claim 1, the step of receiving water application amount information including receiving a starting depth and an ending depth, the starting depth corresponding to the first application level and the ending depth corresponding to the second application level.

3. The method of claim 1, further comprising decreasing the application level according to a smooth pattern as the irrigation system is moved from the first position to the second position.

4. The method of claim 1, further comprising decreasing the application level according to a stepped pattern as the irrigation system is moved from the first position to the second position.

5. The method of claim 1, further comprising decreasing the application level according to a linear pattern as the irrigation system is moved from the first position to the second position.

6. The method of claim 1, further comprising moving the irrigation system along a straight path between the first position and the second position.

7. The method of claim 1, further comprising moving the irrigation system along a curved path between the first position and the second position.

8. The method of claim 1, the first application level being at least 80% of a maximum application rate of the irrigation system and the second application level being at most 30% of the maximum application rate.

9. The method of claim 1, the second application level being zero.

10. The method of claim 1, further comprising moving the irrigation system from the second position to the first position immediately after the irrigation system has been moved from the first position to the second position.

11. The method of claim 1, a water application pattern associated with the movement of the irrigation system from the first position to the second position being identical to a water application pattern associated with the movement of the irrigation system from the second position to the first position, such that a uniform total amount of water is applied by the irrigation system between the first position and the second position.

12. A method of operating a mobile irrigation system, the method comprising:
receiving water application amount information from a user, the amount information including a starting depth and an ending depth, the starting depth being greater than the ending depth;
receiving water application pattern information from the user; the pattern information including a number of irrigation zones;
automatically creating an irrigation plan for an irrigation area using the amount information and the pattern information, including dividing the area into a number of irrigation zones corresponding to the number of irrigation zones received from the user, determining an application depth for each irrigation zone such that a first irrigation zone corresponds to the starting depth, a last irrigation zone corresponds to the ending depth, and a plurality of intermediate irrigation zones each corresponds to an application depth that is less than the starting application depth and greater than the ending application depth, the application depths being progressively less from the first irrigation zone to the last irrigation zone; and
using an automated controller to operate the mobile irrigation system according to the irrigation plan, including—
moving the mobile irrigation system from a first position to a second position, the first and second positions delineating the irrigation area,
as the irrigation system moves from the first position to the second position, applying water from the system at different application depths corresponding to the application depths assigned to each irrigation zone, wherein the first zone corresponds to the first position, the last zone corresponds to the second position, and each of the intermediate zones corresponds to a portion of the area between the first position and the second position,
moving the mobile irrigation system from the second position to the first position, and
as the irrigation system moves from the second position to the first position, applying water from the system at different application depths corresponding to the application depths assigned to each irrigation zone, wherein the first zone corresponds to the second position, the last zone corresponds to the first position, and each of the intermediate zones corresponds to a portion of the area between the second position and the first position so as to reduce irrigation effects on the path near the first and second positions before the irrigation system reverses directions at the first and second positions.

13. The method of claim 12, further comprising moving the irrigation system along a straight path between the first position and the second position.

14. The method of claim 12, further comprising moving the irrigation system along a curved path between the first position and the second position.

15. The method of claim 12, the first application rate being at least 80% of a maximum application rate of the irrigation system and the second application rate being at most 30% of the maximum application rate.

16. The method of claim 12, the second application rate being zero.

17. The method of claim 12, further comprising moving the irrigation system from the second position to the first position immediately after the irrigation system has been moved from the first position to the second position.

18. The method of claim 12, a water application pattern associated with the movement of the irrigation system from the first position to the second position being identical to a water application pattern associated with the movement of the irrigation system from the second position to the first position.

* * * * *